United States Patent [19]

Morgan et al.

[11] Patent Number: 4,952,630
[45] Date of Patent: Aug. 28, 1990

[54] MODIFIED POLYTETRAFLUOROETHYLENE RESINS AND BLENDS THEREOF

[75] Inventors: Richard A. Morgan, Vienna, W. Va.; Charles W. Stewart, Newark, Del.

[73] Assignee: E. I. Du Pont de Nemours and Company, Wilmington, Del.

[21] Appl. No.: 431,948

[22] Filed: Nov. 6, 1989

Related U.S. Application Data

[60] Division of Ser. No. 280,923, Dec. 9, 1988, Pat. No. 4,904,726, which is a continuation-in-part of Ser. No. 140,250, Dec. 31, 1987, abandoned, and a continuation-in-part of Ser. No. 140,249, Dec. 31, 1987, Pat. No. 4,879,362.

[51] Int. Cl.$^5$ .................. C08L 27/16; C08L 27/18; C08L 27/20; C08L 51/00
[52] U.S. Cl. .................. 525/72; 525/64; 525/65; 525/121; 525/153; 525/178; 525/194; 525/195; 525/196; 525/199; 525/200; 524/520
[58] Field of Search .................. 525/72, 64, 199, 200

[56] References Cited

U.S. PATENT DOCUMENTS

| | | | |
|---|---|---|---|
| 3,005,795 | 10/1961 | Busse et al. | 525/199 |
| 3,484,503 | 12/1969 | Magner et al. | 525/200 |
| 3,940,455 | 2/1976 | Kaufman | 525/199 |
| 4,094,949 | 6/1978 | Saxon et al. | 525/199 |
| 4,520,170 | 5/1985 | Kitto | 525/200 |
| 4,767,821 | 8/1988 | Lindner et al. | 525/72 |
| 4,780,490 | 10/1988 | Mizuno et al. | 525/276 |
| 4,837,267 | 6/1989 | Malhotra et al. | 525/276 |
| 4,840,998 | 6/1989 | Shimizu et al. | 525/276 |

Primary Examiner—Carman J. Seccuro

[57] ABSTRACT

Dispersion-process-produced, non-melt-processible, particulate, core-shell, tetrafluoroethylene copolymer comprising recurring units of tetrafluoroethylene and modifying recurring units of at least one ethylenically unsaturated comonomer that is copolymerizable with the tetrafluoroethylene, the number of recurring units of comonomer in the shell being sufficient to enable the copolymer to compound uniformly with an elastomer or plastic without forming visible agglomerates, and blends thereof with elastomeric and plastic resins.

13 Claims, No Drawings

MODIFIED POLYTETRAFLUOROETHYLENE RESINS AND BLENDS THEREOF

CROSS-REFERENCE TO RELATED APPLICATIONS

This is a division of U.S. application Ser. No. 07/280,923 filed Dec. 9, 1988 as a continuation-in-part of joint U.S. application Ser. Nos. 07/140,250 and 07/140,249, both filed Dec. 31, 1987. U.S. application Ser. No. 07/280,923, now U.S. Pat No. 4,904,726 was allowed Aug. 1, 1989 and U.S. application Ser. No. 07/140,250 has been abandoned. U.S. application Ser. No. 07/140,249 was allowed Feb. 22, 1989 and will issue Nov. 7, 1989 as U.S. Pat. No. 4,879,362.

BACKGROUND OF THE INVENTION

The use of polytetrafluoroethylene as an additive to enhance properties of elastomers or plastics has been a long-sought goal because such blends have improved properties such as tear, flame or abrasion resistance over those of the base resin. However, because fibrils and agglomerates of polytetrafluoroethylene (PTFE) ordinarily develop when PTFE is subjected to shear forces during compounding with other resins, the resulting blends are nonuniform and may show excessive modulus and have warping problems. Furthermore, due to the fibrillation and agglomeration, blends which contain known polytetrafluoroethylene resins are difficult to prepare and process especially at high additive levels.

The incorporation of fluoropolymers such as polytetrafluoroethylene and such polymers modified with comonomer into elastomers or thermoplastics has been attempted before. High molecular weight, non-melt-processible polymers of tetrafluoroethylene, including those which contain small amounts of comonomers such as hexafluoropropylene, tend to draw out into fibers, or fibrillate, when sheared. Although it is a useful property for some applications such as paste extrusion onto wire, this fibrillation causes problems when the polytetrafluoroethylene or modified polytetrafluoroethylene is to be incorporated into an elastomer or a thermoplastic. The fibrillating tetrafluoroethylene polymer forms visible agglomerates and results in undesirable increases in modulus when incorporated into elastomers. When compounded into thermoplastics, the fibrillating tetrafluoroethylene polymer causes undesirable melt swell when the polymer melt is forced through an orifice such as the die at the end of an extruder. The addition of melt-processible fluorocopolymers such as Teflon® FEP or PFA fluorocarbon resins or low molecular weight, irradiated PTFE, to elastomers or thermoplastics avoids the problems of fibrillation but this approach does not improve certain properties of the elastomer or thermoplastic.

SUMMARY OF THE INVENTION

Modified polytetrafluoroethylene (PTFE) resins produced by the dispersion process have now been found which can be compounded with elastomers or plastics without the agglomeration or fibrillation that occurs with known modified polytetrafluoroethylene resins. The resins of this invention improve the tear strength and abrasion resistance of elastomers, and improve the extrusion rates, abrasion resistance and flame resistance of plastics. The resins avoid the agglomeration and excessive increases in modulus that usually occur when ordinary polytetrafluoroethylene is added to elastomers and plastics, and they avoid melt-swell when used with plastics.

The modified polytetrafluoroethylene resins of this invention comprise recurring units of tetrafluoroethylene (TFE) and modifying recurring units of at least one ethylenically unsaturated comonomer that is copolymerizable with the TFE in a dispersion process to produce a non-melt-processible tetrafluoroethylene copolymer that has enough comonomer units present near the surface of the copolymer particles to cause the copolymer to compound uniformly with an elastomer or plastic resin without forming visible agglomerates. Preferred comonomers include hexafluoropropylene, perfluoro(alkyl vinyl ethers), preferably wherein the alkyl group is of 1–4 carbon atoms, or mixtures thereof. The comonomer is present in an amount greater than usually employed in commercial comonomer-modified polytetrafluoroethylene, but not in an amount great enough to cause the polytetrafluoroethylene to lose its non-melt-fabricable character. Other comonomers which are believed to be useful include, for example, chlorotrifluoroethylene and perfluoro(alkyl vinyl ethers) wherein the alkyl group is replaced with a hexafluoropropylene oxide oligomer.

It is believed that it is the presence of sufficient comonomer near the particle surface (the shell) which inhibits the fibrillation and agglomeration that occur with previously known polytetrafluoroethylene resins when sheared, as in blending with other polymers. While the comonomer must be present near the surface, the comonomer may be present throughout the copolymer particle if desired, for example, in the core as well as in the shell.

Generally, and usually preferably, the copolymer, that is, the modified polytetrafluoroethylene, has sufficient molecular weight and enough comonomer in the shell so that the tensile elongation at break is greater than 60%, the ratio of yield strength to break strength is greater than 0.50, preferably greater than 0.60, and the rheometer pressure is less than 3500 psi (24.1 MPa), preferably between 1000 psi (6.9 MPa) and 2500 psi (17.2 MPa). The rheometer pressure of the resin is measured by adding 19.2 weight percent "Varsol" hydrocarbon lubricant and extruding the resin through a 1600/1 reduction ratio die. The high comonomer content of the resin causes its rheometer pressure range to be substantially lower than those of commercially available polytetrafluoroethylene resins, whether modified with comonomer units or unmodified. It is to be understood, therefore, that the invention herein may involve the use of monomers which are well known in the art, and that such monomers may have been previously copolymerized. For example, it is known to copolymerize tetrafluoroethylene and hexafluoropropylene, and tetrafluoroethylene and a perfluoro(alkyl vinyl ether), but it is not known to copolymerize these monomers in such a way as to produce the modified polytetrafluoroethylenes of this invention.

When blended into an elastomer or a plastic resin by a procedure that involves shearing action, the modified polytetrafluoroethylene resin will be present in the form of platelets. The platelets are roughly oblong, having a size of between about 10–500 $\mu$m in length and about one-tenth that in thickness. In preferred embodiments, they are about 10–100 $\mu$m in length, 5–10 $\mu$m in width and 2–5 $\mu$m in thickness. They can be isolated, as will be discussed in greater detail hereinafter.

This invention also resides in blends which comprise
(a) an elastomeric organic resin or a plastic organic resin, and
(b) 0.1 to 200 parts per 100 parts of component (a) of a dispersion-process-produced non-melt-processible tetrafluoroethylene copolymer, said copolymer being present in said resin in the form of platelets distributed throughout the resin.

The resulting elastomeric blends have improved tear strength and abrasion resistance. The resulting plastic blends have improved extrusion properties, such as, rates, abrasion resistance and flame resistance and less melt-swell.

DEFICIENCIES OF THE PRIOR ART

Polymerization to make high molecular weight non melt-processible, dispersion-process-produced PTFE resins is well known. The modification of these resins with comonomers and the addition of chain-transfer-agent partway through the polymerization have also been disclosed (such as in U.S. Pat. No. 3,142,665). However, the objectives of these disclosures have clearly been to obtain a resin which fibrillates under shear and which is a suitable resin for "paste extrusion." This is shown by the fact that the lowest rheometer pressure which the aforesaid U.S. patent discloses is 4700 psig (32.4 MPa), whereas the desired rheometer pressure herein is much lower (1000–3500 psig) (6.9–24.1 MPa).

The incorporation of fluoropolymers such as polytetrafluoroethylene into elastomers or thermoplastics has been attempted before. The resins of this invention avoid some of the problems of previously known fluoropolymers and/or show advantages not previously known. High molecular weight, non-melt-processible polymers of tetrafluoroethylene, including those which contain small amounts of comonomers such as hexafluoropropylene, tend to draw out into fibers, or fibrillate, when sheared. Although it is a useful property for some applications such as paste extrusion onto wire, this fibrillation causes problems when the polytetrafluoroethylene or modified polytetrafluoroethylene is to be incorporated into an elastomer or a thermoplastic. The fibrillating polytetrafluoroethylene forms visible agglomerates and results in undesirable increases in modulus when incorporated into elastomers. When compounded into thermoplastics, the fibrillating polytetrafluoroethylene causes undesirable melt swell when the polymer melt is forced through an orifice such as the die at the end of an extruder. The addition of melt-processible fluorocopolymers such as Teflon ® FEP or PFA fluorocarbon resins or low molecular weight, irradiated PTFE, to elastomers or thermoplastics avoids the problems of fibrillation but this approach does not improve certain properties of the elastomer or thermoplastic. In contrast, the resins of the present invention do not cause the above-mentioned problems but do improve certain elastomer or thermoplastic properties.

DETAILED DESCRIPTION OF THE INVENTION

The modified polytetrafluoroethylene polymers of this invention are unusual in that unlike most dispersion-produced polytetrafluoroethylene polymers:
(1) They cannot be successfully paste extruded because their green strength is too low,
(2) They form platelets on shear blending into elastomeric compositions instead of fibrillating,
(3) Their ratio of yield strength to break strength generally is over 0.50, whereas for usual dispersion-produced polymers it generally is below
(4) Their extrusion pressure is less than 3500 psi (24.1 MPa), whereas for usual dispersion-produced polymers it is over 3500 psi (24.1 MPa).

The tetrafluoroethylene copolymers of this invention are made from monomers that are polymerized in aqueous dispersion containing a dispersing agent present in amounts sufficient to cause the polymer particles to remain in dispersed form during polymerization, and then the polymer dispersion is coagulated under low shear to obtain the particles, and the particles are then separated and dried. These particles are called "dispersion-process-produced" particles.

This procedure is described generally in U.S. Pat. No. 3,142,665, supra. Briefly, polymerization is carried out in a gently agitated aqueous medium with the monomers added under pressure. The medium contains a non-telogenic dispersing agent, such as ammonium perfluorooctanoate or caprylate. The amount of dispersing agent can range from 0.05 to 0.5% by weight of water used, and it can be added in increments if desired.

Any suitable initiator such as is described in U.S. Pat. No. 3,142,665 can be used. A preferred system is a mixture of ammonium persulfate and disuccinic acid peroxide. The initiator amount can vary widely; but generally will be between 0.0005 to 0.3% by weight of water. The initiator is added at the beginning of the reaction, and may also be added subsequently. Chain transfer agents may also be used and added in the same manner.

As to hexafluoropropylene (HFP), the amount present in the copolymer is at least 0.08 weight percent, and can be as high as 0.9 weight percent, although the upper limit is not critical, so long as the copolymer remains non-melt-fabricable. HFP content is determined by the method described at column 5, lines 1–12, of U.S. Pat. No. 3,142,665.

For perfluoro(alkyl vinyl ethers), especially of 1–4 alkyl carbon atoms, the amount present should be greater than 0.02 weight percent, and can be as high as 0.3 weight percent. The perfluoro(alkyl vinyl ether) content is determined by Fourier Transform (FT) infrared (IR) spectroscopy. The C—O—C band occurs at 995 cm$^{-1}$ for perfluoropropyl vinyl ether (PPVE) and at 985 cm$^{-1}$ for perfluoromethyl vinyl ether (PMVE). A 0.3 g sample of the polymer is leveled between pieces of aluminum foil in a cylindrical mold, 2.86 cm in inside diameter. A pressure of 1409 kg/cm$^2$ is applied for one minute at ambient temperature. The pressed sample, about 0.025 cm thick, is then analyzed by IR. The sample is scanned from 1040 to 877 cm$^{-1}$. A straight base line is drawn from the absorbance minimum at 1010 cm$^{-1}$ to that at 889 cm$^{-1}$. The ratio of the absorbance from the base line to the maximum at 985 cm$^{-1}$ or 995 cm$^{-1}$, as the case may be, to the absorbance from the base line to the maximum at 935 cm$^{-1}$ is obtained. The actual weight percent perfluoro(propyl vinyl ether) is obtained by multiplying the ratio by 0.14 (determined from a calibration curve). No calibration curve was established for PMVE, but a greater proportion of that added is probably incorporated into the polymer since it is more reactive than PPVE.

A sufficient amount of comonomer must be in the outer portion (the shell) of the copolymer particle. If the comonomer is highly reactive in polymerization, it must be added toward the end of the polymerization to ensure its presence in the outer portion (which is formed last). If the comonomer is not highly reactive, it can be added at the beginning or near the end; or the comonomer/TFE ratio can be increased toward the end of the reaction.

It has been found that the addition of perfluorobutyl ethylene as a third comonomer may reduce formation of coagulum in the polymerization vessel during polymerization.

When the polymerization is complete, the polymer in the polymerization medium is coagulated by conventional procedures, such as described in U.S. Pat. No. 3,142,665, supra, then dried. Coagulation will occur by use of mild agitation and/or by chemical coagulation. Alternatively, the dispersion can be treated chemically, first with a gelling agent, and then with a water-immiscible liquid, to agglomerate the resin, with or without some other filler, as described in various publications, such as in U.S. Pat. Nos. 4,451,616 and 4,368,296.

The tetrafluoroethylene copolymers of this invention are non-melt-fabricable. By this is meant that no melt flow is detected when tested by the standard melt viscosity determining procedure for melt-processable polymers. This test is according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 380.C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 Kpa (6.5 pounds per square inch). If any melt extrudate is observed, it is so noted.

The resins of this invention have an unusually low rheometer pressure, a high level of elongation and a high ratio of yield strength to break strength. They are non-agglomerating and non-fibrillatible, which may be due to the presence of the higher comonomer concentration in the shell than heretofore was present in known modified polytetrafluoroethylene polymers.

The tetrafluoroethylene copolymers of this invention have low break strengths, but about the same yield strength as commercially available resins (thus higher ratios of yield to break strengths). This indicates that the resin's apparent modulus (stiffness) due to drawing is less for these copolymers. They also have low rheometer pressures. Both of these observations indicate less fibril or other molecular orientation upon stressing the polymer. This may explain, in part, why uniform blends of these resins in elastomers and other polymers are easier to prepare and have lower moduli than those obtained with known non-melt-processable resins. Reduced fibrillation will allow more uniform blends but some toughness as indicated by a minimum elongation is also required for the fluoropolymer to reinforce the other plastics or elastomers. The elongation of a modified PTFE resin is a function of its molecular weight and of the resin comonomer content and type. A reduced PTFE homopolymer molecular weight will reduce the tendency to form fibrils during shear but if the molecular weight is reduced enough to essentially stop fibril formation, the elongation of the resulting resin is too low for it to reinforce another elastomer or plastic. It has been found that the presence of some minimum level of comonomer other than TFE will drastically reduce the tendency to fibrillate without a significant drop in molecular weight and thus elongation. The comonomer may also alter the resin crystallinity and change the form of the drawn fluoropolymer resin from fibril to elongated sheets or plates. The combination of properties achieved by means of the invention herein has heretofore never been available in the art.

As stated hereinabove, the blends of the invention are blends of an elastomer or plastic with 0.1 to 200 parts per 100 parts of elastomer or plastic, of the aforesaid dispersion-produced non-melt-processable tetrafluoroethylene copolymer. Preferably, larger amounts of the copolymer are usually used for elastomers, for example, 1 to 200 parts per 100 parts of elastomer. For plastics, the amount is preferably 0.1–40 parts per 100 parts of plastic.

No separate phases are visible to the naked eye in compounded blends of the new resins in other plastics or elastomers. Photomicrographs of blends show that even at a magnification as high as 2000× using an optical microscope, no fibrous structure is apparent. If the refractive indices of the blended materials are different, a platelet structure is seen in which the platelet size preferably ranges from 10–100 $\mu$m long, 5–10 $\mu$m wide, and 2–5 $\mu$m thick. At high concentrations in the matrix, the plate-like particles may be interconnected to form discontinuous sheets. The platelets of this invention can be isolated by shearing the resin of this invention in a solid water-soluble salt, and then dissolving the salt in water, leaving the platelets.

The term "elastomer" as used herein has its normal meaning in the art, that is, the cross-linked material, after being stretched to twice its normal length and released will return with force to substantially its original length. The term "plastic" as used herein has its usual meaning in the art, that is, it is a normally rigid, high molecular weight thermoplastic or thermosetting organic polymer, usually possessing some crystallinity or glass-like behavior.

The elastomer matrix of the blend can be any elastomer including, but not limited to, vinylidene fluoride copolymers, for example, vinylidene fluoride/hexafluoropropylene (VF2/HFP) copolymers; VF2/HFP/TFE copolymers; TFE/PMVE copolymers; ethylene/propylene/diene (EPDM) copolymers; styrene/butadiene copolymers; polychloroprene; chlorosulfonated polyethylene; silicones; fluorosilicone elastomers; and natural rubber. The elastomer can be uncured or it can contain curing ingredients and be cured. The uncured elastomer has a Mooney Viscosity, ML-4 (100° C.) greater than 1. The plastic matrix can be any plastic including, but not limited to, polyolefins, for example, polyethylene (PE); polypropylene (PP); polyamides, for example, nylon; polysulfones (PS); polyvinylidene fluoride (PVDF); epoxies; polyether ether ketones (PEEK); and melt processable copolymers of tetrafluoroethylene, such as tetrafluoroethylene/hexafluoropropylene (TFE/HFP); and tetrafluoroethylene/perfluoro(propyl vinyl ether) (TFE/PPVE) copolymers.

The elastomeric or plastic matrix can contain fillers, such as reinforcing agents or fire retarding agents. The plastic matrix may be characterized as thermoplastic or thermosetting. The modified polytetrafluoroethylene resins of this invention can be mixed into the elastomer or plastic using conventional techniques and equipment, such as a two-roll mill, a Banbury Internal Mixer, or a twin-screw or single-screw extruder. The shear strain rate during mixing is typically greater than 10 sec$^{-1}$., for example, between 10 and 1000 sec$^{-1}$. Different levels of comonomer content can be used, depending on the level of shear during subsequent compounding. The more comonomer present in the PTFE resin, the less sensitive the resin is to compounding shear levels. The combination of the degree of resin comonomer modification, the loading level in the elastomer or plastic, and the shear level of blending is such that no fibrils develop.

Analytical Tests for the TFE Copolymer Resins

Samples of the tetrafluoroethylene copolymers were molded and sintered as described in ASTM D-1457 for the measurement of tensile properties. Microtensile bars were cut and tested as described in ASTM D-1708-80 at a strain rate of two inches per minute (5.1 cm/min).

Rheometer pressure was measured in accordance with ASTM D-1457-83 Section 12.8, except that the resin was not sieved before mixing with the "Varsol" lubricant and the preform was made in a 26 mm diameter extension tube at 300 psi (2.1 MPa). Measurements were made at the 19.2% lubricant level called for in the ASTM method. For additional data presented in the examples, some samples were tested at 18% lubricant level.

Standard specific gravity (SSG) was determined by water displacement of a standard molded test specimen in accordance with ASTM D 1457-69. The standard molded part was formed by preforming 12.0 g of the powder (copolymer) in a 2.86 cm diameter die at a pressure of 34.5 MPa, followed by sintering the preform by heating from 300° C. to 380° C. at 2° C./minute, holding at 380° C. for 30 minutes, cooling to 295° C. at 1° C./minute and holding at this temperature for 25 minutes, after which the specimen is cooled to 23° C. and tested for specific gravity.

Raw dispersion particle size or RDPS values were determined by Photon Correlation Spectroscopy using a Brookhaven 2030 Correlator manufactured by Brookhaven Instruments, Inc. of Holtsville, N.Y., using an argon ion laser at 512.5 nm at a 90° angle, and 25° C.

The PFBE content (when this comonomer was used) of the polymer could not be determined accurately and reproducibly by Fourier Transform infrared spectroscopy (FTIR). It was estimated to be present in the polymer equal to the amount added because of its high reactivity.

EXAMPLES 1-7

A horizontally-disposed, water-steam jacketed, cylindrical stainless steel autoclave (clave), having a paddle-wheel agitator running the length of the autoclave, and having a length-to-diameter ratio of about 1.5 to 1 and a water capacity of 39,000 parts, was charged with 20,400 parts of demineralized water, 5 parts of ammonium perfluorocaprylate dispersing agent and 600 parts of paraffin wax. The autoclave contents were heated to 70° C. and the autoclave was then evacuated and purged with TFE monomer. A reduced pressure was then left on the autoclave, the agitator was turned on at 43 rpm (revolutions per minute) and the contents were heated up to 88° C. Perfluorobutylethylene (PFBE) and/or hexafluoropropylene (HFP) were added to the autoclave and sufficient tetrafluoroethylene (TFE) was added to achieve an autoclave pressure of 380 psig (2.6 Mpa). Then 500 parts of the first initiator solution was pumped into the autoclave. After kickoff occured (10 psig or 0.07 MPa drop in pressure), the temperature of the reaction mixture was controlled at 90° C. for the duration of the polymerization. The agitator speed was maintained at 43 rpm and the autoclave pressure was maintained at 380 psig (2.6 MPa) by the addition of tetrafluoroethylene monomer until the desired level of tetrafluoroethylene addition was complete. When 1360 parts of tetrafluoroethylene had been added after kickoff, 1000 parts of a solution of 25 parts ammonium perfluorocaprylate in demineralized water was pumped to the autoclave at 50 parts/minute. After 6800 parts of tetrafluoroethylene had been added after kickoff, 300 parts of a second initiator/methanol solution in demineralized water was added to some of the batches. After the specified tetrafluoroethylene addition was complete (measured after kickoff), the reaction was continued until the pressure reacted down to 185 psig (1.3 MPa). The autoclave was then vented to atmospheric pressure and the dispersion was dropped from the autoclave. After cooling, the supernatant paraffin wax was removed and weighed. The dispersions were coagulated by stirring or by the chemical gelation/solvent agglomeration method to give a powder which was separated and then dried at 150° C. for four days. A summary of the examples and product analyses is given in Tables I and II.

EXAMPLE 8

The autoclave described in Examples 1–7 was charged with 20,400 parts of demineralized water, five parts of ammonium perfluorocaprylate dispersing agent and 600 parts of paraffin wax. The autoclave contents were heated to 80° C. and the autoclave was then evacuated and purged with TFE monomer. A reduced pressure was then left on the autoclave and it was heated up to 88° C. after which it was pressured up to 380 psig (2.6 MPa) with tetrafluoroethylene monomer. The agitator was turned on at 43 rpm and 500 parts were added to the autoclave of a solution of 1.2 parts ammonium persulfate, 15 parts disuccinic acid peroxide, and 3 parts methanol made up to 1500 parts with demineralized water. After kickoff occurred (10 psig or 0.07 MPa drop in pressure), the temperature of the reaction mixture was controlled at 90° C. for the duration of the polymerization. The agitator speed was maintained at 42 rpm and the autoclave pressure was maintained at 380 psig (2.6 MPa) by the addition of tetrafluoroethylene monomer. When 1360 parts of tetrafluoroethylene had been added after kickoff, 1000 parts of a solution of 25 parts of ammonium perfluorocaprylate in demineralized water was pumped into the autoclave at 50 parts/minute. When 5900 parts of tetrafluoroethylene monomer had been added after kickoff, the monomer feed was stopped and the pressure was allowed to react down to 185 psig (1.3 MPa). The autoclave was then vented to 15–20 psig (0.11–0.14 MPa) with the agitator turned off. About 78 parts of hexafluoropropylene were pumped into the clave and the autoclave was then repressurized to 380 psig (2.6 MPa) with tetrafluoroethylene. Another 300 parts of the initiator/methanol solution described above were pumped into the autoclave simultaneously with tetrafluoroethylene repressurization. The agitator was turned on and the speed raised slowly to 40 rpm where it was held for the remainder of the polymerization. After kickoff again occurred, tetrafluoroethylene monomer was added to maintain the 380 psig (2.6 MPa) pressure. After 3630 parts of tetrafluoroethylene had been added after the second kickoff, the agitator was turned off and the autoclave was vented to atmospheric pressure. The dispersion was then dropped from the autoclave at atmospheric pressure and cooled. The dispersion was coagulated by stirring to give a powder which was then isolated and dried at 150° C. for four days. The polymer contained 0.16 weight percent hexafluoropropylene and had an SSG of 2.271. The ratio of polymer weight polymerized during the two stages of reaction was 65/35 including the reaction of a portion of the tetrafluoroethylene used to pressurize the autoclave. The calculated hexafluoropropylene content of the polymer made during the second reaction stage was 0.45 weight percent.

The example was repeated five times and the polymer of all 6 runs was blended.

The product data for the blend are shown in Table III.

EXAMPLE 9

The autoclave described in the previous examples was charged with 20900 parts of demineralized water and 15 parts of ammonium perfluorocaprylate dispersing agent. The autoclave contents were heated to 65° C. and the autoclave was then evacuated and purged with TFE monomer. A reduced pressure was left on the autoclave, the agitator was then turned on at 43 rpm and 14.5 parts of perfluorobutyl ethylene and 78 parts of hexafluoropropylene were added. The autoclave was heated to 88° C. and it was then pressured up to 380 psig (2.6 MPa) with TFE monomer. Then 500 parts were added to the autoclave of a solution of 14 parts disuccinic acid peroxide (DSP) and 0.4 parts ammonium persulfate (APS) made up to 1000 parts with demineralized water.

After kickoff occurred (10 psig or 0.07 MPa drop in pressure), the temperature of the reaction mixture was controlled at 90° C. for the duration of polymerization. The agitator speed was maintained at 43 rpm and the autoclave pressure was maintained at 380 psig (2.6 MPa) by the addition of TFE monomer until 8170 parts of TFE had been added after kickoff. When 1360 parts of TFE had been added after kickoff, 1000 parts of a solution of 25 parts ammonium perfluorocaprylate in demineralized water was pumped into the autoclave at 90 parts/minute. After 5450 parts of TFE had been added after kickoff, 300 parts of a solution of 10.0 parts disuccinic acid peroxide, 1.0 parts ammonium persulfate, and 5.0 parts methanol made up to 1000 parts with demineralized water was added to the autoclave at 50 parts/minute. The TFE feed was cut off after the addition of 8170 parts TFE (measured after kickoff). Agitation was continued until the autoclave pressure reacted down to 185 psig (1.3 MPa). The autoclave was vented to atmospheric pressure and the dispersion was dropped from the autoclave. The dispersion, which contained about 30.5% solids, was coagulated by stirring to give a powder which was dried in a 150° C. oven for four days. Product data are shown in Table III.

EXAMPLE 10

The autoclave described in the previous examples was charged with 20,800 parts of demineralized water, 5 parts of ammonium perfluorocaprylate, and 600 parts of paraffin wax. With the autoclave contents at 65° C., the autoclave was evacuated and purged with tetrafluoroethylene. A reduced pressure was left on the autoclave and it was heated to 85° C. with the agitator on at 43 rpm. The autoclave was then pressured to 380 psig (2.6MPa) with tetrafluoroethylene monomer and 500 parts were added to the autoclave of a solution of 1.0 part APS, 10 parts DSP, and 5 parts methanol made up to 1000 parts with demineralized water. After kickoff (10 psig or 0.07 MPa drop in pressure) occurred, the temperature of the reaction mixture was maintained at 85° C. for the duration of the polymerization. The agitator speed was held at 43 rpm and the autoclave pressure was maintained at 380 psig (2.6 MPa) by the addition of tetrafluoroethylene monomer. When 1360 parts of tetrafluoroethylene had been added after kickoff, 1000 parts of a solution of 25 parts ammonium perfluorocaprylate in demineralized water was pumped into the autoclave at 50 parts/minute. When 5900 parts of tetrafluoroethylene had been added to the autoclave after kickoff, monomer feed and the agitator were stopped and the autoclave contents were cooled to below 75° C. The autoclave was vented and then evacuated to 5" of mercury vacuum. A valve to a cylinder of perfluoromethylvinyl ether (PMVE) was then opened allowing 7.8 parts of the PMVE to enter the autoclave. The valve was then closed, the agitator was restarted at 43 rpm, and the autoclave contents were heated to 85° C. The autoclave was then again repressurized to 380 psig (2.6 MPa) with tetrafluoroethylene monomer and 270 parts were added to the autoclave of a solution of 1.0 part APS, 10 parts DSP, and 5 parts methanol made up to 1000 parts with demineralized water. After kickoff (10 psig or 0.07 MPa drop in pressure) occurred, the temperature of the reaction mixture was maintained at 85° C. for the duration of the polymerization. The agitator speed was held at 43 rpm and the autoclave pressure was maintained at 380 psig (2.6 MPa) by the addition of tetrafluoroethylene monomer. After 1360 parts of tetrafluoroethylene had been added after the second kickoff, the monomer feed was cut off and the pressure was allowed to react down to 185 psig(1.3 MPa). The agitator was then turned off and the autoclave was vented. The dispersion was dropped from the autoclave and cooled. The dispersion was coagulated by stirring and the polymer powder was dried at 150° C. for 3 days.

Product data are included in the Table III.

EXAMPLE 11

This polymerization and product isolation was carried out in a similar manner to Example 10 with two exceptions: (1) 14.5 parts of perfluorobutylethylene (PFBE) were added to the autoclave after purging and evacuating (before tetrafluoroethylene addition) and (2) the amount of PMVE added was 7.7 parts.

The product data are included in Table III.

EXAMPLE 12

The clave described in the previous examples was charged with 20,900 parts of demineralized water, 600 parts of paraffin wax, and 1.3 parts of ammonium perfluorocapyrlate dispersing agent. The clave contents were heated to 65° C. and the clave was then evacuated and purged with TFE monomer. A reduced pressure was left on the clave and 7.7 parts of perfluoropropylvinyl ether (PPVE) were added. The agitator was turned on at 46 rpm and the clave was heated to 75° C. The clave was then pressured up to 400 psig with TFE monomer. Then 250 parts were added to the clave at the rate of 50 parts/minute of a solution of 1.4 parts ammonium persulfate made up to 1000 parts with demineralized water. After kickoff occurred (10 psig or 0.07 MPa drop in pressure), the temperature of the reaction mixture was controlled at 75° C. for the duration of polymerization. The agitator speed was maintained at 46 rpm and the clave pressure was maintained at 400 psig (2.6 MPa) by the addition of TFE monomer. When 1360 parts of TFE had been added after kickoff, 1000 parts of a solution of 29 parts ammonium perfluorocaprylate in demineralized water was pumped into the clave at 90 parts/minute. After 7490 parts of TFE had been added after kickoff, 1000 parts of a solution of 10.0 parts succinic acid, 0.7 part ammonium persulfate, and 0.7 part methanol made up to 1000 parts with demineralized water was added to the clave at 50 parts/minute. Simultaneously the reactor pressure setpoint was reduced to 200 psig and the pressure was reacted down to that level. This procedure increased the PPVE/TFE monomer ratio. The TFE feed was then continued until 11,800 parts of TFE (measured after kickoff) had been added to the reactor. The agitator was then turned off, the clave was vented to atmospheric pressure, and the dispersion was dropped from the clave. The dispersion, which contained about 37.8% solids, was coagulated by stirring to give a powder which was separated and then dried in a 150° C. oven for three days.

Product data are shown in Table III.

EXAMPLE 13

In this example, polymerization was carried out as in Example 12 with the following exceptions: (1) the reactor precharge contained 1.0 part ammonium perfluorocaprylate, 5 parts succinic acid, 20,900 parts demineralized water, and 600 parts of paraffin wax, (2) the amount of PPVE added after evacuation was 12.2 parts and (3) the second initiator solution, added after 7490 parts of TFE addition, contained 0.7 part of ammonium persulfate and 0.7 part of methanol (no succinic acid) made up to 1000 parts with demineralized water. The resin was coagulated and dried.

Product data are shown in Table III.

EXAMPLE 14

A blend of 1 part of polymer powder from Example 8 with 19 parts granular potassium chloride was placed in a oven at 100° C. for two hours. The blend was then removed from the oven and immediately poured into a preheated (100° C.) mortar where it was ground with a pestle for one minute. The potassium chloride was then dissolved away with a water/methanol mixture, leaving the polymer. After drying at 150° C., the polymer was examined with a microscope and was found to be present primarily as platelets from 10 to 500 micrometers across and about one tenth as thick.

As a control, 5 parts of a commercial "fine powder" paste extrusion resin, which contained HFP as a modifier, was treated identically to that above. The polymer, after washing and drying, was present as fibrous agglomerates. There was no evidence of the platelet structure.

TABLE I

| | | | | First Initiator/ Methanol Solution | | | Second Initiator/ Methanol Solution | | | TFE Added After | Dispersion | |
|---|---|---|---|---|---|---|---|---|---|---|---|---|
| Ex. No. | Wax parts | HFP parts | PFBE parts | APS[1] parts | DSP[2] parts | Methanol parts | APS parts | DSP parts | Methanol parts | Kickoff parts | % Solids | RDPS micrometers |
| 1 | 600 | 78 | 14.5 | 0.9 | 7.5 | 1.0 | 0.54 | 4.5 | 0.6 | 9900 | 36.5 | 0.196 |
| 2 | 600 | 78 | 0 | 0.73 | 6.0 | 0.8 | 0.44 | 3.6 | 0.5 | 9900 | 36.5 | 0.220 |
| 3 | 600 | 78 | 14.5 | 0.83 | 6.9 | 1.4 | 0.50 | 4.2 | 0.8 | 9900 | 35.2 | 0.191 |
| 4 | 600 | 78 | 14.5 | 0.90 | 7.5 | 1.0 | 0 | 0 | 0 | 9900 | 35.3 | NM |
| 5 | 600 | 78 | 14.5 | 0.83 | 6.9 | 1.4 | 0 | 0 | 0 | 9900 | 28.3 | 0.174 |
| 6 | 600 | 86 | 14.5 | 0.25 | 7.0 | 0.5 | 0.39 | 3.0 | 1.2 | 9900 | 35.8 | NM |
| 7 | 600 | 78 | 0 | 0 | 7.0 | 1.0 | 0.30 | 4.2 | 0.9 | 9900 | 34.7 | 0.232 |

[1]APS means ammonium persulfate
[2]DSP means disuccinic acid peroxide
NM means not measured.

TABLE II

| | | | PRODUCT SUMMARY, EXAMPLES 1-7 | | | | |
|---|---|---|---|---|---|---|---|
| | | | 1600/1 Rheometer Pressure | | Tensile | | Melt |
| Ex. No. | SSG | % HFP | 18.0% "Varsol" (MPa) | 19.2% "Varsol" (MPa) | Yield/Break Strength Ratio | Tensile Elongation at Break, % | Flow at 380° C. |
| 1 | 2.225 | 0.52 | 17.0 | 10.5 | 1.00 | 355 | No |
| 2 | 2.253 | 0.41 | 18.0 | 11.0 | 1.26 | 155 | No |
| 3 | 2.227 | 0.29 | 20.9 | 11.5 | 0.76 | 445 | No |
| 4 | 2.228 | 0.40 | 24.8 | NM | 1.18 | 193 | NM |
| 5 | 2.209 | 0.29 | 24.7 | 12.0 | 0.80 | 368 | No |
| 6 | 2.213 | 0.29 | 23.6 | NM | 0.68 | 439 | No |
| 7 | 2.247 | 0.30 | 20.6 | NM | 0.94 | 408 | No |

NM means not measured

TABLE III

| | | PROPERTY DATA SUMMARY FOR EXAMPLES 8-13 | | | | | |
|---|---|---|---|---|---|---|---|
| | | | | 1600/1 Rheometer Pressure | | | |
| | | Comonomer | | 18.0% "Varsol" | 19.2% "Varsol" | Tensile Yield/Break | Elongation | Melt Flow at |
| Example No. | SSG | Type | Level | (MPa) | (MPa) | Ratio | at Break | 380° C. |
| 8 (Blend of six runs) | NM | HFP | 0.16% | 16.4 | 8.5 | 1.29 | 447% | No |

TABLE III-continued
PROPERTY DATA SUMMARY FOR EXAMPLES 8-13

| | | Comonomer | | 1600/1 Rheometer Pressure | | Tensile Yield/Break | Elongation | Melt Flow at |
|---|---|---|---|---|---|---|---|---|
| | | | | 18.0% "Varsol" | 19.2% "Varsol" | | | |
| Example No. | SSG | Type | Level | (MPa) | (MPa) | Ratio | at Break | 380° C. |
| 9 | 2.198 | HFP | 0.29% | 20 | 11.4 | 0.58 | 427 | No |
| 10 | 2.274 | PMVE | 0.090%* | 12.0 | NM | 1.21 | 416 | NM |
| 11 | 2.219 | PMVE | 0.089%* | 22.1 | 11.0 | 0.57 | 522 | No |
| 12 | 2.179 | PPVE | 0.03% | 25.6 | 21.6 | 0.53 | 400 | No |
| 13 | 2.179 | PPVE | 0.04% | 28.9 | 23.1 | 0.54 | 474 | NM |

*Comonomer levels shown are levels added to batch.
NM means not measured.

The following examples describe blending of the modified polytetrafluoroethylene resins with elastomers and thermoplastics.

EXAMPLE 15

A modified PTFE fine powder copolymer resin was prepared as in Example 8. Samples of the modified PTFE copolymer were mixed with a 45 Mooney Viscosity elastomeric VF2/HFP 60:40 (by weight) copolymer (vinylidene fluoride/hexafluoropropylene), fillers and curatives on a two roll rubber mill at a shear strain rate of about 100 sec$^{-1}$ for 10 minutes according to the following recipe.

| | Sample | | | |
|---|---|---|---|---|
| | A (Control) | B | C | D |
| | | Parts | | |
| VF2/HFP copolymer | 96 | 96 | 96 | 96 |
| Example 8 PTFE polymer | — | 10 | 20 | 30 |
| Carbon Black (MT Black) | 30 | 30 | 30 | 30 |
| Ca(OH)$_2$ | 6 | 6 | 6 | 6 |
| MgO | 3 | 3 | 3 | 3 |
| Additive 1* | 1.28 | 1.28 | 1.28 | 1.28 |
| Additive 2** | 2.8 | 2.8 | 2.8 | 2.8 |

*A 2:1 blend of a VF2/HFP copolymer with benzyltriphenylphosphonium chloride.
**A 48:50:2 blend of a VF2/HFP copolymer with bisphenol AF and rice bran wax.

After mixing, sheets were formed and press-cured at 177° C. for 15 minutes, then post cured at 232° C. for 24 hours.

Samples were die cut from the cured sheet and tested at 25° C. and 177° C. for tear strength according to ASTM method D 470 and for tensile properties according to ASTM method D 412. Measurements were made both in the direction of mill rotation and transverse direction and then averaged.

| | Sample | | | |
|---|---|---|---|---|
| | A (Control) | B | C | D |
| Tested at 25° C. | | | | |
| Tear Strength (kN/m) | 4 | 6 | 7 | 7 |
| M$_{100}$ (MPa) | 4 | 5 | 7 | 9 |
| TB (MPa) | 15 | 15 | 15 | 16 |
| EB (%) | 260 | 260 | 250 | 230 |
| Tested at 177° C. | | | | |
| Tear Strength (kN/m) | 0.5 | 0.9 | 1.6 | 2.3 |
| M$_{100}$ (MPa) | — | 4 | 4 | 4 |
| TB (MPa) | 3 | 4 | 5 | 6 |
| EB (%) | 95 | 225 | 125 | 110 |

M$_{100}$ = Modulus at 100% elongation.
TB = Tensile strength.
EB = Elongation at break.
kN/m = kiloNewtons/meter The control blend (A) is a representative commercial VF2/HFP elastomeric copolymer formulation. All blends processed well providing smooth, rubbery homogeneous appearing slabs and test pieces. When the Example 8 PTFE polymer was mill-mixed into the VF2/HFP copolymer, during preparation of samples B, C and D there was no agglomeration of the Example 8 PTFE polymer. Examination of test pieces, prior to addition of black and curatives, using an optical microscope, as well as transmission and scanning electron microscopes showed the Example 9 PTFE polymer to be uniformly dispersed as distinct particles with no evidence of fibrillation. Plate-like aggregates of size 10×5×2 μm, composed of distinct particles were observed. Comparison of samples B, C and D with the control, A, shows that Example 8 PTFE polymer provides a significant degree of reinforcement and improvement in tear strength at 25° C. and at 177° C., with no fibrillation or agglomeration into visible clumps or nodes.

The copolymers of Examples 4, 10 and 12 behaved in a like fashion when blended with the VF$_2$/HFP elastomer.

COMPARATIVE EXPERIMENT 1

This experiment shows that comonomer must be present in the TFE polymer.

A sample of 20 parts of a commercially available PTFE paste extrusion resin, which has no comonomer in the shell and which has a ratio of yield strength to break strength of only 0.43, and which has a rheometer pressure of 35 MPa at a reduction ratio of 1600:1 was mixed with 100 parts of a 45 Mooney Viscosity VF2/HFP 60:40 (by weight) elastomeric copolymer on a two roll rubber mill at a shear strain rate of about 100 sec$^{-1}$ for 10 minutes. It was observed that the PTFE resin partially agglomerated into visible white clumps or nodes approximately 2-4 mm in diameter with long fine fibrils connecting the nodes. Additional mixing tended to cause further agglomeration rather than to improve dispersion. The blend had a high modulus.

COMPARATIVE EXPERIMENT 2

This experiment demonstrates that the PTFE must be non-melt-fabricable.

Two melt-fabricable copolymers based on TFE were mixed with a 45 Mooney Viscosity VF2/HFP 60:40 copolymer, fillers and curatives on a two roll rubber mill at a shear strain rate of 100 sec$^{-1}$ for 10 minutes according to the following recipe:

|  | Sample | | |
|---|---|---|---|
|  | A (Control) | B | C |
|  | Parts | | |
| VF2/HFP Copolymer | 96 | 96 | 96 |
| TFE Copolymer #1 | — | 20 | — |
| TFE Copolymer #2 | — | — | 20 |
| MT Black | 30 | 30 | 30 |
| Ca(OH)$_2$ | 6 | 6 | 6 |
| MgO | 3 | 3 | 3 |
| Additive 1* | 1.28 | 1.28 | 1.28 |
| Additive 2** | 2.8 | 2.8 | 2.8 |

*A 2:1 blend of a VF2/HFP copolymer with benzyltriphenylphosphonium chloride.
**A 48:50:2 blend of a VF2/HFP copolymer with Bisphenol AF and rice bran wax.

TFE copolymer #1 is a melt-fabricable, thermoplastic copolymer containing 84 weight percent TFE and 16 weight percent hexafluoropylene; melt flow number 6.5 (ASTM D 2116). TFE Copolymer #2 is a melt-fabricable, thermoplastic copolymer containing 97 weight percent TFE and 3 weight percent perfluoropropyl vinyl ether; melt flow number 13.

After mixing, sheets were formed and press-cured at 177° C. for 15 minutes, then post cured at 232° C. for 24 hours.

Samples were die cut from the cured sheet and tested as in Example 15.

|  | Sample | | |
|---|---|---|---|
| Tested at 25° C. | A | B | C |
| Tear Strength (kN/m) | 4 | 3 | 3 |
| M$_{100}$ (MPa) | 4 | 4 | 4 |
| T$_B$ (MPa) | 15 | 10 | 12 |
| E$_B$ (%) | 260 | 200 | 200 |

The control sample, A, is a representative commercial VF2/HFP copolymer formulation. Samples B and C, which contain melt-fabricable copolymers based on TFE, processed well and provided smooth, rubbery, homogeneous appearing slabs and test pieces. There was no apparent agglomeration or fibrillation of the TFE based copolymer.

Comparison of samples B and C with the control, A, shows that melt-fabricable copolymers based on TFE do not provide any degree of reinforcement to the elastomer and in fact reduce certain tensile and tear properties. Therefore, even though melt-fabricable copolymers based on TFE can be added to elastomers, at high levels, with no agglomeration or fibrillation, they act as nonreinforcing fillers and have limited value.

EXAMPLE 16

Dry blends were prepared of a commercially available melt-processible tetrafluoroethylene/hexafluoropropylene (TFE/HFP) copolymer, containing 88% TFE and 12% HFP and having a melt flow number of 6.8, with several levels of both a commercially available high molecular weight dispersion-process-produced TFE homopolymer powder and powder from Example 1 above. These blends were then extruded through a combination of a 28 mm twin-screw extruder feeding a 1.5 inch (3.81 cm) single-screw extruder which fed a die. After extrusion, the blends were passed through a melt indexer at 372° C. under the conditions described herein for measuring standard melt viscosities. The percent melt swell values were then obtained by comparing the diameters of the extrudates with the melt indexer orifice. The results below show that the modified resin of Example 1 affords much less melt swell than the commercially available PTFE homopolymer.

| Additive to Melt-Processible TFE/HFP | Melt Swell |
|---|---|
| None | 7.0% |
| 0.6% High Molecular Weight PTFE | 70% |
| 3.0% High Molecular Weight PTFE | 158% |
| 0.5% Example 1 Powder | 7.0% |
| 1.5% Example 1 Powder | 29% |
| 4.8% Example 1 Powder | 30% |
| 9.1 Example 1 Powder | 38% |

EXAMPLE 17

Dry blends were prepared and extruded as above of mixtures of a melt-processible tetrafluoroethylene/perfluoro(propyl vinyl ether) (TFE/PPVE) copolymer, containing 97% TFE and 3% PPVE and having a melt flow number of 13, with 3% of powder from Example 1 and with 3% low molecular weight irradiated PTFE. Films 7-8 mils (0.1778-0.2032 mm) thick of each blend and of the unmodified copolymer were compression molded at 350° C. and then immediately quenched in cold water. The fatigue resistance of the films were measured by the MIT flex life test described in U.S. Pat. No. 2,946,763. It can be seen from the results below that the addition of irradiated PTFE reduced the number of flex cycles, whereas the Example 1 powder actually raised the number of cycles to failure.

| Sample | Number of Flex Cycles to Failure |
|---|---|
| Control of TFE/PPVE melt-processible Copolymer | 4945 |
| Control resin containing 3% irradiated PTFE powder | 3395 |
| Control resin containing 3% Example 1 powder | 5535 |

EXAMPLE 18 - ADDITION OF TFE COPOLYMER TO SILICONS ELASTOMER

The TFE copolymer of Example 8 was mixed into a commercially available, 18 Mooney Viscosity fluorosilicone elastomer ("Silastic" 2311 Dow Corning) along with curatives, on a two-roll rubber mill at a shear rate of about 100 sec$^{-1}$ for ten minutes according to the following recipe.

| Sample | A parts | B parts |
|---|---|---|
| Silicone Rubber | 100 | 100 |
| TFE Copolymer Ex. 8 | — | 10 |
| Dicumyl Peroxide | 5 | 5 |

After mixing, sheets were formed and press-cured at 150° C. for 10 minutes.

Samples were die cut (cutout with a die form) and tested as in Example 15.

| Sample | A | B |
|---|---|---|
| Tested at 25° C. | | |
| Tear Strength (kN/m) | 0.8 | 7 |
| M$_{100}$ (MPa) | — | — |
| T$_B$ (MPa) | 7 | 8 |
| E$_B$ (%) | 80 | 60 |

The control sample, A, is a representative commercial silicone elastomer formulation. Both samples processed well, providing smooth, rubbery homogeneous appearing slabs and test pieces. When the TFE copolymer resin was mill mixed into the silicone elastomer, during preparation of sample B, there was no visible agglomeration of the TFE copolymer into clumps or nodes. The copolymer was dispersed as distinct particles, with no apparent fibrillation. Comparison of sample B with the control, A, shows that TFE resin provides a significant degree of reinforcement and improvement in tear strength.

EXAMPLE 19 - ADDITION OF TFE COPOLYMER TO EPDM ELASTOMER

The TFE copolymer of Example 8 was mixed into a commercially available, 40 Mooney Viscosity EPDM elastomer (Nordel® 1040; E. I. du Pont de Nemours and Company) along with filler and curatives, on a two-roll rubber mill at a shear rate of about 100 sec$^{-1}$ for ten minutes according to the following recipe:

| Sample | A(Control) Parts | B Parts |
|---|---|---|
| EPDM Elastomer | 100 | 100 |
| TFE Copolymer Ex. 8 | — | 30 |
| Zinc Oxide | 5 | 5 |
| Stearic Acid | 1 | 1 |
| HAF Black | 80 | 80 |
| Paraffinic Oil | 50 | 50 |
| Zinc Dibutyldithiocarbamate | 2 | 2 |
| Tetraethyl Thiuram Disulfide | 1 | 1 |
| Zinc Mercaptobenzothiazole | 1 | 1 |
| Sulfur | 1.5 | 1.5 |

After mixing, sheets were formed and press-cured at 160° C. for 20 minutes.

Samples were die cut and tested as in Example 15.

| Sample | A | B |
|---|---|---|
| Tested at 25° C. | | |
| Tear Strength (kN/m) | 6 | 8 |
| $M_{100}$ (MPa) | 1 | 1 |
| $T_B$ (MPa) | 18 | 17 |
| $E_B$ (%) | 641 | 656 |

The control sample, A, is a representative commercial EPDM elastomer formulation. Both samples processed well providing smooth, rubbery homogeneous-appearing slabs and test pieces. When the TFE copolymer was mill mixed into the EPDM elastomer, during preparation of sample B, there was no visible agglomeration of the TFE resin into clumps or nodes. The resin was dispersed as distinct particles and as plate-like aggregates of distinct particles, with no apparent fibrillation. Comparison of sample B with the control, A, shows that the PTFE resin provides a significant improvement in tear strength to the EPDM elastomer.

EXAMPLE 20 - ADDITION OF MODIFIED PTFE TO POLYCHLOROPRENE ELASTOMER

The TFE copolymer resin of Example 8 was mixed into a commercially available 60 Mooney Viscosity polychloroprene elastomer (Neoprene GNA, Du Pont) along with filler and curatives, on a two-roll rubber mill at a shear rate of about 100 sec$^{-1}$ for ten minutes according to the following recipe:

| | Parts | |
|---|---|---|
| Sample | A | B |
| Polychloroprene | 100 | 100 |
| TFE Copolymer Ex. 8 | — | 30 |
| Stearic Acid | 0.5 | 0.5 |
| SRF Black | 30 | 30 |
| Zinc Oxide | 5 | 5 |
| Magnesium Oxide | 4 | 4 |

After mixing, sheets were formed and press-cured at 153° C. for 30 minutes.

Samples were die cut and tested as in Example 15.

| Sample | A | B |
|---|---|---|
| Tested at 25° C. | | |
| Tear Strength (kN/m) | 6 | 11 |
| $M_{100}$ (MPa) | 3 | 4 |
| $T_B$ (MPa) | 20 | 17 |
| $E_B$ (%) | 450 | 400 |

The control sample, A, is a representative commercial polychloroprene elastomer formulation. Both samples processed well providing smooth, rubbery homogeneous-appearing slabs and test pieces. When the TFE resin was mill mixed into the polychloroprene elastomer, during preparation of sample B, there was no visible agglomeration of the TFE resin. The resin was dispersed as distinct particles and as plate-like aggregates of distinct particles, with no apparent fibrillation. Comparison of sample B with the control, A, shows that the TFE resin provides a significant improvement in tear strength.

EXAMPLE 12 - ADDITION OF MODIFIED PTFE TO SBR ELASTOMER

The TFE copolymer resin of Example 8 was mixed into a commercially available, 50 Mooney Viscosity SBR 1500 elastomer along with filler and curatives, on a two-roll rubber mill at a shear rate of about 100 sec$^{-1}$ for ten minutes according to the following recipe.

| | Parts | |
|---|---|---|
| Sample | A(Control) | B |
| SBR 1500 | 100 | 100 |
| TFE Copolymer Ex. 8 | — | 30 |
| HAF Black | 50 | 50 |
| Stearic Acid | 2 | 2 |
| Zinc Oxide | 5 | 5 |
| Sulfur | 2 | 2 |
| 2-Mercaptobenzothiazole | 1.5 | 1.5 |
| Copper Dimethyldithiocarbamate | 0.1 | 0.1 |

After mixing, sheets were formed and press-cured at 153° C. for 30 minutes.

Samples were die cut and tested as in Example 15.

| Sample | A(Control) | B |
|---|---|---|
| Tested at 25° C. | | |
| Tear Strength (kN/m) | 5 | 8 |
| $M_{100}$ (Mpa) | 3 | 5 |
| $T_B$ (MPa) | 23 | 21 |
| $E_B$ (%) | 350 | 350 |

The control sample, A, is a representative commercial SBR elastomer formulation. Both samples processed well providing smooth, rubbery homogeneous-appearing slabs and test pieces. When the TFE resin was mill mixed into the SBR elastomer, during preparation of sample B, there was no visible agglomeration of the TFE resin. The resin was dispersed as distinct particles and as plate-like aggregates of distinct particles, with no apparent fibrillation. Comparison of sample B with the control, A, shows that TFE resin provides a significant improvement in tear strength.

EXAMPLE 22

Samples of the above TFE copolymer resin of Example 8 were mixed with a 55.4/44.2/0.4 TFE/P-MVE/VF2 copolymer (tetrafluoroethylene/perfluoro(methylvinyl-ether)/vinylidene fluoride), fillers and curatives on a two roll rubber mill at 100° C. and at a shear strain rate of 100 sec$^{-1}$ for 10 minutes according to the following recipe:

|  | Parts | |
| Sample | A(Control) | B |
| --- | --- | --- |
| TFE/PMVE/VF2 Copolymer | 100 | 100 |
| TFE Copolymer Ex. 8 | none | 30 |
| Carbon Black (SAF) | 10 | 10 |
| PbO | 4 | 4 |
| K2AF* | 3 | 3 |
| Dicyclohexyl-18-Crown 6 | 4 | 4 |

*Dipotassium salt of Bisphenol AF.

After mixing, sheets were formed and press cured at 177° C. for 30 minutes, and post cured for two days under nitrogen at 288° C.

TESTING

Samples were die cut from the cured sheet and tested at 25° C. for tear strength according to ASTM method D 470 and for tensile strength according to ASTM method D 412. Measurements were made both in the direction of mill rotation and transverse direction and then averaged.

|  | Parts | |
| Sample | A(Control) | B |
| --- | --- | --- |
| Tested at 25° C. | | |
| Tear Strength (kN/m) | 3.7 | 12 |
| $M_{100}$ (MPa) | 10 | 14 |
| $T_B$ (MPa) | 22 | 14 |
| $E_B$ (%) | 150 | 100 |

$M_{100}$ = Modulus at 100% elongation.
$T_B$ = Tensile strength.
$E_B$ = Elongation at break.

All blends processed well providing smooth, rubbery homogeneous-appearing slabs and test pieces. When the TFE copolymer was mill mixed into the TFE/P-MVE/VF2 copolymer, during preparation of sample B, there was no agglomeration of the TFE copolymer. Examination of test pieces, prior to addition of black and curatives, using an optical microscope showed the TFE copolymer to be uniformly dispersed with no evidence of fibrillation. Plate-like aggregates of size $10 \times 5 \times 2$ μm composed of distinct particles were observed. Comparison of sample B with the control A shows that the TFE copolymer provides a significant improvement in tear strength at 25° C. with no agglomeration into visible clumps or nodes.

EXAMPLE 23 - DRIP SUPPRESSANT

A sample of the TFE copolymer resin prepared in Example 8 was mixed, at a level of 5%, into a commercially available ETFE copolymer (ethylene/tetrafluoroethylene copolymer having 2.2 weight percent perfluorobutyl ethylene units and a melt viscosity of $1 \times 10^4$ poise at 297° C.) at 280° C., using a Brabender Plastograph Mixer. There was no visible agglomeration or fibrillation of the TFE copolymer of Example 8. Electron photomicrographs showed that the TFE copolymer was uniformly dispersed as distinct particles or as plate-like aggregates of distinct particles of dimension $10 \times 5 \times 2$ μm or smaller. No fibrillation of the TFE copolymer could be seen.

The above composition containing 5% TFE copolymer of Example 8, as well as a control of the ETFE copolymer, was compression molded into test bars 10 cm $\times$ 1 cm $\times$ 0.25 cm. When these test bars were held vertically in the open flame of a Bunsen Burner, it was observed that the composition containing the TFE copolymer charred, with no melting or dripping; whereas the ETFE control melted and readily dripped into the flame. This shows that the TFE resin acts as an effective drip suppressant, even in the absence of fibrillation of the TFE resin.

EXAMPLE 24 - INCREASED PROCESSING RATE

A sample of the TFE copolymer resin prepared in Example 8 was mixed, at a level of 1%, into a commercially available TFE/HFP copolymer containing 12.3 weight percent HFP and having a melt flow number (ASTM D 1238-70) of 6.8, at 370° C. using a W&P 28 mm twin-screw extruder. There was no visible agglomeration or fibrillation of the PTFE resin. The above composition, containing 1% of the TFE copolymer, as well as a control of TFE/HFP copolymer, were extrusion coated onto AWG 22 copper wire at a thickness of 0.1 mm. It was observed that the composition containing the TFE copolymer of Example 8 could be extrusion coated onto the wire at a line speed of 400 m/min, at a draw-down ratio of 80:1, whereas the TFE/HFP control could be coated at a line speed of only 250m/min, at a draw-down ratio of 80:1, due to cone breakage at higher speeds. From this, it can be seen that the TFE copolymer resin improves the extrusion speeds, even though fibrillation of the TFE resin does not occur.

EXAMPLE 25

Tetrafluoroethylene copolymers prepared as described in Examples 4, 9 and 11 were each blended into respective samples of a 45 Mooney Viscosity VF2/HFP 60:40 (weight ratio) copolymer, along with fillers and curatives, on a two-roll rubber mill at a shear strain rate of about 100 sec$^{-1}$ for 10 minutes, according to the following recipe:

|  | Parts | | | |
| Sample | A | B | C | Control |
| --- | --- | --- | --- | --- |
| VF2/HFP copolymer | 100 | 100 | 100 | 100 |
| TFE copolymer Ex. 9 | 43 | — | — | — |
| TFE copolymer Ex. 4 | — | 43 | — | — |
| TFE copolymer Ex. 11 | — | — | 43 | — |
| MT Black | 5 | 5 | 5 | 5 |
| Ca(OH)$_2$ | 6 | 6 | 6 | 6 |
| MgO | 3 | 3 | 3 | 3 |
| Additive 1[1] | 1.28 | 1.28 | 1.28 | 1.28 |

-continued

| Sample | Parts | | | |
|---|---|---|---|---|
| | A | B | C | Control |
| Additive 2[2] | 2.8 | 2.8 | 2.8 | 2.8 |

[1] A 2:1 blend of a VF2/HFP copolymer with benzyltriphenylphosphonium chloride.
[2] A 48:50:2 blend of a VF2/HFP copolymer with Bisphenol AF and rice bran wax.

All samples processed well, providing smooth, rubbery homogeneous-appearing sheets. When the TFE copolymer resins were mill mixed into the respective VF2/HFP copolymer samples, there was no agglomeration of the TFE copolymer. Examination of the compositions using an optical microscope showed the TFE copolymer to be uniformly dispersed in the copolymer as distinct particles with no evidence of agglomeration or fibrillation. Plate-like aggregates of size $10 \times 5 \times 2$ μm, composed of distinct particles, were observed. After mixing, sheets were formed and press-cured at 177° C. for 15 minutes, then post cured at 232° C. for 24 hours.

The samples were die cut from the cured sheet and tested for tear strength at room temperature according to ASTM method D 470 and for tensile properties at room temperature according to ASTM method D 412. Measurements were made both in the direction of mill rotation and transverse direction and then averaged.

| | Sample | | | |
|---|---|---|---|---|
| | A | B | C | Control |
| Tested at 25° C. | | | | |
| Tear Strength (kN/m) | 7 | 6 | 10 | 5 |
| $M_{100}$ (MPa) | 4 | 4 | 7 | 3 |
| $T_B$ (MPa) | 9 | 9 | 20 | 9 |
| $E_B$ (%) | 312 | 318 | 280 | 368 |

$M_{100}$ = Modulus at 100% elongation
$T_B$ = Tensile Strength
$E_B$ = Elongation at Break Comparison of samples A, B, C and the control shows that the modified PTFE resins provide a significant degree of reinforcement and improvement in tear strength at 25° C. with no fibrillation or agglomeration into visible clumps or nodes.

We claim:
1. Blend of
   (a) a melt-processable plastic resin, and
   (b) 0.1 to 200 parts per 100 parts of component (a) of a dispersion-process-produced, non-melt-processible, particulate, tetrafluoroethylene copolymer, the copolymer comprising recurring units of tetrafluoroethylene and modifying recurring units of a comonomer selected from the class consisting of hexafluropropylene, perfluror(alkyl vinyl ethers), perfluoro(alkyl vinyl ethers) wherein an alkyl group is replaced with a hexafluoropropylene oxide oligomer, chlorotrifluoroethylene, and a mixture thereof, the number of recurring units of comonomer in the shell being sufficient to enable the copolymer to compound uniformly with said resin without forming visible agglomerates but not in an amount great enough to cause the polytetrafluoroethylene to lose its non-melt-fabricable character.
2. The blend of claim 1 wherein component (b) is present in an amount of 0.1-40 parts per 100 parts of plastic resin.
3. The blend of claim 1 wherein the comonomer of the tetrafluoroethylene copolymer is selected from the class consisting of hexafluoropropylene, perfluoro(alkyl vinyl ethers), and a mixture of them.
4. The blend of claim 3 wherein the alkyl group of the perfluoro(alkyl vinyl ether) contains 1-4 carbon atoms.
5. The blend of claim 1 wherein the tetrafluoroethylene copolymer is comprised of at least 0.08 weight percent of recurring units of hexafluoropropylene.
6. The blend of claim 1 wherein the tetrafluoroethylene copolymer is comprised of greater than 0.02 weight percent of recurring units of a perfluoro(alkyl vinyl ether).
7. The blend of claim 1 containing a filler.
8. The blend of claim 1 containing a curing agent.
9. Cured blend of claim 8.
10. Blend of claim 2 wherein the plastic is an ethylene/tetrafluoroethylene copolymer.
11. Blend of claim 2 wherein the plastic is a tetrafluoroethylene/hexafluoroproylene copolymer.
12. Blend of claim 2 wherein the plastic is a tetrafluoroethylene/perfluoro(propyl vinyl ether) copolymer.
13. Melt processed blend of claim 1.

* * * * *